(12) United States Patent
Kerrigan et al.

(10) Patent No.: US 6,235,321 B1
(45) Date of Patent: May 22, 2001

(54) SNACK FOOD PRODUCT AND METHOD OF PREPARING SAME

(75) Inventors: Gary L. Kerrigan, Sheboygan, WI (US); Craig J. Schroeder, Springfield; Roy A. Barham, Bolivar, both of MO (US); John J. Strandholm; Michael J. Pagel, both of Plymouth, WI (US)

(73) Assignee: Dairy Farmers of America, Inc., Kansas City, MO (US)

( * ) Notice: Subject to any disclaimer, the term of this patent is extended or adjusted under 35 U.S.C. 154(b) by 0 days.

(21) Appl. No.: 09/450,967

(22) Filed: Nov. 30, 1999

(51) Int. Cl.[7] .................................................. A23G 19/055
(52) U.S. Cl. ........................ 426/36; 426/576; 426/579; 426/582; 426/583
(58) Field of Search .................................. 426/576, 582, 426/579, 583, 36

(56) References Cited

U.S. PATENT DOCUMENTS

| | | |
|---|---|---|
| 3,843,808 * | 10/1974 | Ziccarelli . |
| 4,324,811 * | 4/1982 | Eugley . |
| 4,568,548 * | 2/1986 | Sprenger . |
| 4,929,456 * | 5/1990 | Bejarano-Wallens et al. . |
| 5,614,244 * | 3/1997 | Heick et al. . |
| 5,792,500 * | 8/1998 | Housset et al. . |
| 5,816,704 | 10/1998 | Campbell et al. . |
| 5,846,579 * | 12/1998 | Hagerman et al. . |
| 5,894,028 * | 4/1999 | Alden et al. . |
| 5,902,625 * | 5/1999 | Barz et al. . |
| 6,113,953 * | 9/2000 | McMahon et al. . |

* cited by examiner

Primary Examiner—Cynthia L. Nessler
(74) Attorney, Agent, or Firm—Hovey, Williams, Timmons & Collins

(57) ABSTRACT

An improved snack food product in the form of resilient, molded, self-sustaining bodies preferably made from a heated mixture comprising a dairy product (cheese, yogurt or pudding), gelatin, fat and water. The product bodies are small and bite sized, having a mass to surface area ratio of from about 0.05–5 g/cm$^2$, which facilitates molding thereof. Preferred food products are prepared by first creating a heated flowable mixture of including cheese, gelatin, fat and water, and depositing small quantities of the mixture into molding depressions formed in powdered starch; after hardening, the resultant products are separated from the starch and packaged.

20 Claims, 1 Drawing Sheet

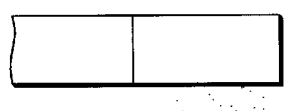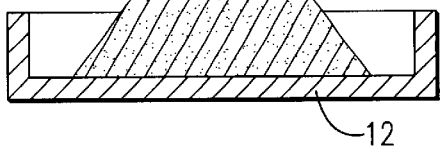
FIG. 1.
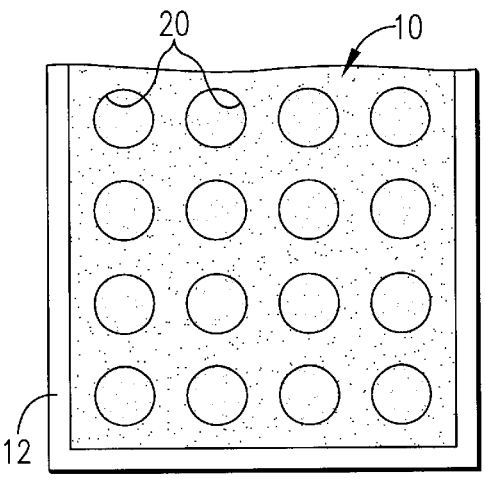
FIG. 6.
FIG. 2.
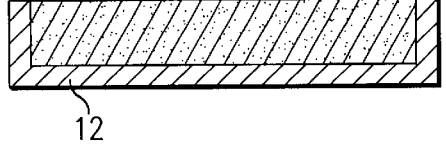
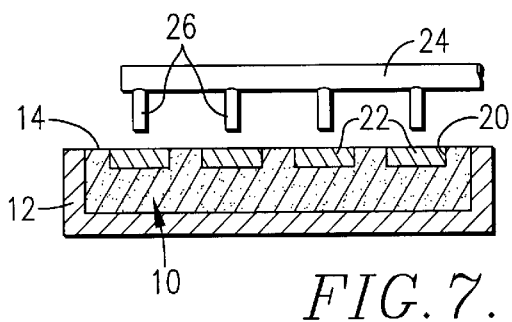
FIG. 7.
FIG. 3.
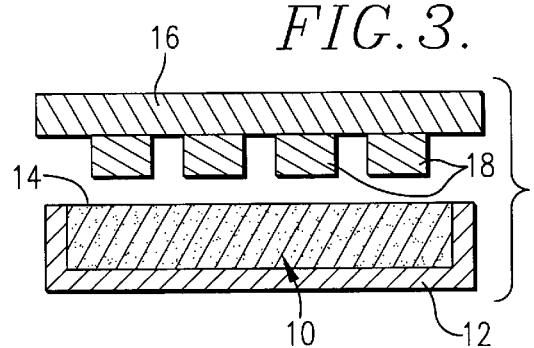
FIG. 4.
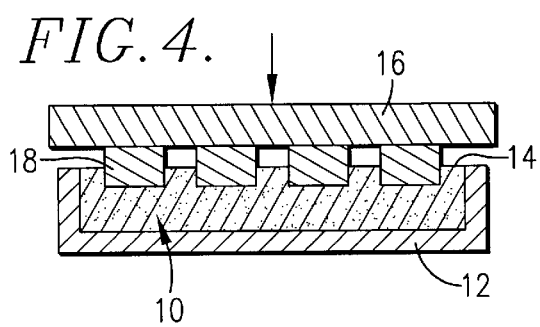
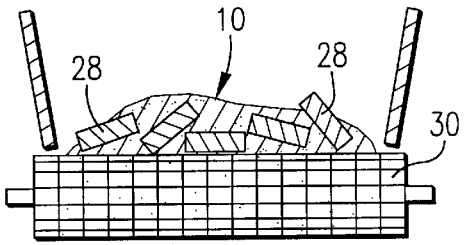
FIG. 8.
FIG. 5.
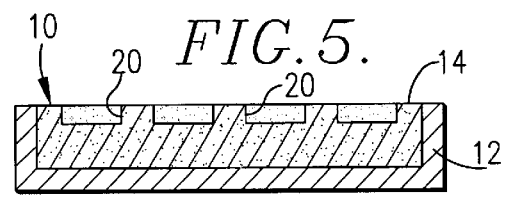
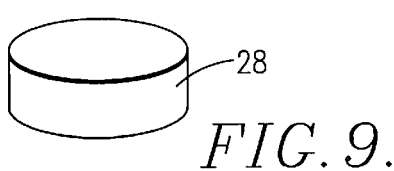
FIG. 9.

SNACK FOOD PRODUCT AND METHOD OF PREPARING SAME

BACKGROUND OF THE INVENTION

1. Field of the Invention

The present invention is concerned with an improved molded snack food product and method for preparing such product. More particularly, the invention pertains to resilient, self-sustaining, chewable food bodies including non-gelatin protein (at least a part of which is dairy product-derived protein), gelatin, water and fat; in preferred forms, the products contain a substantial fraction of a dairy product such as cheese, yogurt or pudding. The method of the invention involves starch molding of heated flowable food mixtures by first forming appropriately configured depressions in a starch layer, depositing the food mixture in the depressions and allowing hardening thereof, followed by separating the finished food products from the starch.

2. Description of the Prior Art

The prior art relating to the manufacture of dairy products such as cheeses and yogurts is immense. Through the years, a huge variety of cheeses and other products have been prepared with a multitude of different ingredients. Commonly, hard cheeses such as cheddars are produced in large block form and are later subdivided as slices or shreds. Similarly, soft cheeses in the nature of mozzarellas are produced as blocks or cubes and are then cut or shredded for use.

The growth in snack food consumption over the past few decades has been substantial. Many consumers prefer the ease and convenience associated with snack foods such as pretzels, chips, granola bars and the like. However, these snack foods are often perceived as lacking in nutrition and bear the onus of non-natural or "artificial" foods. Certain types of cheeses and particularly mozzarellas have been packaged in tubular containers for ready consumption. While these products have achieved a certain measure of success, they are not particularly attractive to young children.

U.S. Pat. No. 5,846,579 to Haggerman et al. describes hard cheeses where gelatin is added during the cheese-making process. Thus, gelatin may be added to the cheese milk before rennet addition or after whey-off. The gelatin is described as adding resilience and taste to the final cheese product. The '579 patent is not concerned with production of attractively shaped, small snack-type products.

U.S. Pat. Nos. 5,679,395, 3,615,690 and 5,330,773 also describe the use of gelatin as an additive in cream cheese, molded meat and cheese composites, and as an additive during cheese making. Here again, these references do not deal with the production of small, bite sized snack products.

There is accordingly a need in the art for an improved food product which includes a substantial fraction of cheese or other dairy product, and which can be molded to virtually any shape (e.g., sports or recreational items) to yield resilient snacks having desirable mouth feel and taste properties.

SUMMARY OF THE INVENTION

The present invention overcomes the problems outlined above, and provides improved food products in the form of resilient, self-sustaining bodies having non-gelatin protein (at least apart of which is derived from dairy product(s)), gelatin, fat and water. The products are relatively small and bite sized, and have a mass to surface area ratio of from about 0.05–5 g/cm². Preferably, the molded bodies have a pH of from about 4.4–6.2, and a water activity of from about 0.7–1, whereby the bodies have substantial shelf lives. The gelatin fraction gives the bodies a desired resilience and mouth feel.

Preferably, the molded food bodies of the invention include a substantial proportion of one or more dairy products such as cheese, yogurt and pudding therein. These base materials provide non-gelatin protein and also give the final products desirable taste and texture qualities. In this connection, such base materials are supplemented with gelatin and other ingredients such as whey, milk solids, flavorants and colorants.

In preparative procedures, a flowable mixture is created by heating and mixing the desired starting ingredients, followed by high shear processing. Good results have been obtained through the use of an auger-type lay down mixer with direct steam injection into the mixture during blending to achieve a mixture temperature of from about 150–190° F. Thereupon, the heated mixture is passed through a high shear mixer or homogenizer until essential homogeneity is achieved.

In order to mold the bite sized products, a starch molding technique is followed. Specifically, a layer of powdered starch is prepared, wherein the starch is at a temperature of from about 50–100° F. and has a reduced moisture content of about 5–8% by weight. The starch layer is then imprinted with an impression device to form a series of shaped depressions therein. These depressions are filled with the heated food mixture, and the latter is allowed to harden therein at a temperature of from about 30–90° F. The hardened bodies are then separated from the starch, allowed to equilibrate, and are packaged.

BRIEF DESCRIPTION OF THE DRAWINGS

FIG. 1 is a schematic view illustrating the first step in the product molding process wherein preconditioned starch is placed within a tray;

FIG. 2 is a schematic vertical sectional view illustrating the starch tray after starch skimming to present an essentially flat top surface on the starch layer;

FIG. 3 is a schematic vertical sectional view depicting placement of a product mold above a filled starch tray;

FIG. 4 is a schematic vertical sectional view illustrating molding of depressions in the starch layer using the product mold;

FIG. 5 is a schematic vertical sectional representation depicting formed depressions in the starch layer;

FIG. 6 is a schematic top view illustrating a series of the depressions formed in the starch layer;

FIG. 7 is a schematic vertical sectional view showing filling of the depressions with a heated flowable food mixture;

FIG. 8 is a schematic vertical sectional view depicting separation of the molded food products from the starch; and FIG. 9 is a perspective view of a formed food product in accordance with the invention.

DETAILED DESCRIPTION OF THE PREFERRED EMBODIMENT

The preferred process in accordance with the invention is illustrated schematically in the drawing. The process is in some ways similar to starch molding processes long practiced in the candy and confectionary industries. In the first step (FIG. 1), particulate starch 10 is deposited into a tray or similar holder 12. It is important that the starch (which can be derived from any common source) be preconditioned to reduce the moisture content thereof. In particular, starch as-received commonly has a moisture content of 10–11% by weight, but it has been found that this moisture content should be reduced to a level of from about 5–8% by weight for use in the invention. Moreover, the starch should be at essentially room temperature or slightly warmer, preferably about 70–100° F. If the particulate starch is not preconditioned to a relatively low moisture content, the starch tends to agglomerate on the surface of the final product, and is difficult to remove.

FIG. 2 illustrates the starch 10 within tray 12 after filling and skimming of the starch. This presents an upper surface 14 for the starch layer as best seen in FIG. 2. It is to be understood that the starch layer is not pressed into the tray 12, but rather starch is merely dumped into the tray 12 and skimmed off using a knife or the like to provide the flat upper surface 14. The density of the starch in the tray is preferably from about 0.5–0.7 g/cm$^2$.

The next step (FIG. 3) involves forming a series of depressions or openings in the starch 10 through the upper surface 14. A variety of equipment can be used for this purpose, but in the example of the drawing, a plate 16 having a series of depending cylindrical projections 18 is positioned above the tray 12. The plate 16 is then pressed into the starch 10 as shown (FIG. 4) through the upper surface 14. This creates a series of open-top depressions 20 in the starch 10 (FIG. 5) which are complemental with the projections 18. This can better be seen in FIG. 6 which shows that the depressions 20 are in a spaced array.

The depressions 20 are next filled with a flowable food mixture 22 until the upper surface of the latter is essentially coincident with starch surface 14. In the illustrated embodiment, a manifold 24 having a series of depending outlet pipes 26 is located above the depressions 20, and the flowable mixture 22 is directed through the respective pipes 26 for filling of the depressions. Generally, this flowable mixture has a temperature of from about 150–190° F. during the filling step. The mixture 22 is then allowed to harden within the individual depressions 20 to form the self-sustaining bodies 28 of the invention. Such hardening can be carried out at room temperature or, if desired, in a refrigerated area. In the case of room temperature hardening, a period of from about 45 minutes to 4 hours is normally sufficient. At the end of the hardening step, the bodies 28 typically have a moisture content of from about 30–60% by weight and a temperature of from about 40–90° F. The products of the invention have a mass to surface area ratio in the range of from about 0.05–5 g/cm$^2$. It has been found that bodies having greater than a 5 g/cm$^2$ ratio are difficult to mold owing to the fact that the starch tends to tenaciously cling to the surfaces of the bodies because, during hardening, substantial moisture migrates from the bodies into the surrounding starch.

The formed bodies 28 are then separated from the starch 10. This can be accomplished by a variety of techniques. FIG. 8 illustrates one such method wherein the entire contents of the tray 12 are dumped onto a sieve apparatus 30 allowing the bulk of the starch 10 to fall into a lower collector 32. Thereafter, residual starch is removed from the bodies 28 by directing a positive pressure air stream over the bodies with appropriate collection of such residual starch. An advantage of the invention is that the starch so collected from the process can be reused. This involves heating the starch as required to again reduce its moisture content to the desired level, which also controls the pathogens in the starch.

The makeup and handling of the flowable food mixture 22 is an important aspect of the invention. In general, the mixture is made up of non-gelatin protein, gelatin, water and fat, wherein the non-gelatin protein of the mixture comprises a quantity of dairy product-derived protein (i.e., protein from dairy products such as cheese, whey and other milk products). In preferred forms, the mixture includes a substantial proportion of a dairy ingredient selected from the group consisting of cheese, yogurt, pudding and mixtures thereof, typically from about 10–80% by weight, and more preferably from about 15–50% by weight. In the case of cheeses, cream cheese, American, Cheddar, Colby, Monterey Jack, Swiss, mozzarella and mixtures thereof are preferred. The overall flowing mixture 22 also typically includes other ingredients such as whey powder, non-fat dry milk (NFDM) powder, lactic acids, preservatives and colors.

In order to prepare the flowable mixture, the ingredients are mixed together and heated. In one preferred method, such heating is accomplished by direct steam injection. After such heating, the mixture is subjected to high shear processing to render the mixture essentially homogenous. The steam injection is carried out until the flowable mixture has the desired temperature of from about 150–190° F. High shear processing can be carried out in a high shear mixer (e.g., a Votator) or in a homogenizer. The goal of this processing is to minimize the size of the gelatin particles so that these are essentially invisible to the eye in the final product 28.

The following table sets forth broad and preferred ranges for important ingredients and properties of the flowable mixtures of the invention. Is to be understood that these ranges are approximations.

TABLE 1

| Mixture Ingredients/Properties[1] | Broad Range | Preferred Range |
| --- | --- | --- |
| Non-gelatin protein content | 5–25% | 9–15% |
| % of non-gelatin protein provided by dairy protein | 50–100% | 75–100% |
| Dairy protein | 5–25% | 9–15% |
| Gelatin content | 3–10% | 5.2–8% |
| Gelatin Bloom value | 150–350 | 200–300 |
| Water content | 35–70% | 45–65% |
| Fat content | 5–30% | 12–25% |
| Emulsifying salts solids content | 1–4% | 1.2–2.5% |
| Whey powder content | 0–10% | 4–8% |
| NFDM content | 0–8% | 0.5–4% |
| Dairy product[2] content | 10–80% | 15–50% |
| pH | 4.4–6.2 | 4.8–6.0 |
| Temperature | 150–190° F. | 160–180° F. |

[1]All percentages on a weight basis, with the total weight of the mixture taken as 100% by weight.
[2]Dairy product is selected from the group consisting of cheese, yogurt, pudding and mixtures thereof.

The final product 28 resulting from the process is in the form of a resilient, self-sustaining body having a desirable mouth feel and "bite." The product moreover has a refrigerated shelf life (40° F.) of at least about six months, and a room temperature shelf life of at least about thirty days. The product is essentially free of visually observable gelatin particles under a 25× magnification.

The following table sets forth important broad and preferred ingredient and property ranges for the final products of the invention. Again, these ranges are approximate.

TABLE 2

| Final Product Ingredients/Properties[1] | Broad Range | Preferred Range |
|---|---|---|
| Non-gelatin protein content | 6–36% | 10.5–18% |
| % of non-gelatin protein provided by dairy protein | 50–100% | 75–100% |
| Dairy protein | 6–36% | 10.5–18% |
| Gelatin content | 4.5–12% | 6.2–10.5% |
| Gelatin Bloom value | 150–350 | 200–300 |
| Water content | 30–60% | 35–50% |
| Fat content | 6–36% | 14–30% |
| Emulsifying salts solids content | 1.2–4.8% | 1.4–3.0% |
| Whey powder content | 0–12% | 4–10% |
| NFDM content | 0–10% | 0.6–5% |
| Dairy product[2] content | 12–90% | 18–60% |
| pH | 4.4–6.2 | 4.8–6.0 |
| Water activity | 0.7–1.0 | 0.8–0.9 |
| Mass/surface area ratio | 0.05–5 g/cm$^2$ | 0.15–2 g/cm$^2$ |

[1]All percentages on a weight basis, with the total weight of the mixture taken as 100% by weight.
[2]Dairy product is selected from the group consisting of cheese, yogurt, pudding and mixtures thereof.

The following examples set forth preferred formulae and procedures for producing products in accordance with the invention. It is to be understood, however, that these examples are provided by way of illustration and nothing therein should be taken as a limitation upon the overall scope of the invention.

EXAMPLE 1

In this example, a cheese snack product was prepared using the overall procedure schematically illustrated in FIGS. 1–8, except that each of the starch depressions 20 were manually filled with cheese mixture.

The formula used for the flowable cheese mixture is set forth below.

TABLE 3

| Ingredient | % By Weight |
|---|---|
| Water | 29.52 |
| Water from steam injection | 6.40 |
| Cheddar cheese | 43.89 |
| NFDM | 0.99 |
| Whey powder | 5.87 |
| Carotenal 73 | 0.05 |
| Salt | 0.56 |
| Cream (80% fat) | 4.11 |
| Disodium phosphate | 2.05 |
| Lactic acid (50%) | 0.55 |
| Sorbic acid | 0.15 |
| Gelatin (270 Bloom) | 5.82 |

This mixture contained 43.89% cheese, 18.40% fat, 54.0% moisture, 6.08% carbohydrate, 0.15% sorbic acid, 4.62% ash, 0.89% whey protein, 16.9% other protein, 11.10% casein, 5.65% lactose, 1.62% emulsified solids, 1.48% salt, 0.37% calcium, 1.09% sodium and 27.69% ash, carbohydrates and protein.

The ingredients of the mixture were placed in an auger-type lay down cooker and blended. During this time, culinary steam was injected into the mixture for a period of about 1 minute, until the mixture reached a temperature of about 180° F. The steam injection was then terminated and mixing was continued for about 20 seconds. At this point, the mixture was passed through a Votator shear pump to assure essential homogeneity.

A series of starch trays were prepared as described previously using low moisture (about 5–8%) particulate starch at 70–80° F. with a density of about 0.6 g/cm$^2$. A male mold plate having a series of shaped projections (e.g., different types of sports balls such as soccer and footballs) was used to print the starch layer and form appropriately configured depressions therein. The prepared, heated cheese mixture was then manually deposited in each depression to fill it. The filled trays were then allowed to stand at room temperature for a period of about two hours. The contents of the trays were then dumped into a sieve apparatus to separate the majority of the starch from the hardened food product bodies. As a final measure, these bodies were passed under a positive pressure air stream to remove all residual starch.

The final snack product had the following profile: moisture, 56.0%, fat, 22.40%, carbohydrate, 7.40%, sorbic acid, 0.19%, ash, 5.63%, whey protein, 1.08%, gelatin protein, 6.13%, casein, 13.52%, lactose, 6.88%, emulsifing solids, 1.97%, salt, 1.80%, calcium, 0.45%, and sodium, 1.33%.

The final product had a pH of about 5.7 and exhibited desirable resilience and mouth feel qualities.

EXAMPLE 2

In this example, a yogurt-based snack product was prepared. The starting formula was:

TABLE 4

| Ingredient | % By Weight |
|---|---|
| Water | 24.11 |
| Water from steam injection | 6.40 |
| Non-fat dry yogurt powder | 12.98 |
| FD&D Red 40 | 0.0014 |
| Artificial strawberry flavor | 0.20 |
| Natural strawberry flavor | 0.40 |
| Strawberry puree | 7.50 |
| Baker's sugar | 15.0 |
| Salt | 0.50 |
| Cream (80% fat) | 25.38 |
| Sorbic acid | 0.20 |
| Gelatin (270 Bloom) | 7.30 |

This mixture had the following profile: fat, 16.99%, moisture, 55.40%, carbohydrate, 18.19%, sorbic acid, 0.16%, ash, 1.36%, whey protein, 0.77%, protein, 9.06%, casein, 3.27%, gelatin protein, 6.31%, lactose, 5.58%, salt, 0.56%, calcium, 0.13%, sodium, and 0.24%, ash.

The foregoing ingredients were prepared as described in Example 1 and deposited into preformed starch bed openings, and allowed to harden therein. Separation of starch and recovery of the hardened final products was likewise carried out as in Example 1. The final product had the following profile: fat, 20.68%, moisture, 44.00%, carbohydrate, 22.15%, sorbic acid, 0.20%, ash, 1.66%, whey protein, 0.94%, protein, 11.03%, casein, 3.98%, gelatin protein, 6.31%, lactose, 6.80%, salt, 0.68%, calcium, 0.15%, and sodium, 0.29%. This product had a pH of about 5.1.

We claim:

1. A food product comprising a resilient, self-sustaining body including a non-gelatin protein content of from about 6–36% which comprises a quantity of dairy product-derived protein, a gelatin content of from about 4.5–12%, a water content of from about 30–60% and a fat content of from about 6–36%, wherein all percentages are by weight and are based upon the total weight of the body taken as 100% by weight, said body having a pH of from about 4.4–6.2, a water activity of from about 0.7–1.0 and a mass to surface area ratio of from about 0.05–5 g/cm$^2$.

2. The food product of claim 1, said gelatin having a gel strength of from about 150–350 Bloom.

3. The food product of claim 2, said gel strength being from about 200–300 Bloom.

4. The food product of claim 1, said body including from about 1.2–4.8% by weight emulsifying salts solids content.

5. The food product of claim 4, said body including from about 1.4–3.0% by weight emulsifying salts solids content.

6. The food product of claim 1, said non-gelatin protein content being from about 6–36%.

7. The food product of claim 1, from about 50–100% of said non-gelatin protein content being made up of said dairy product-derived protein.

8. The food product of claim 7, from about 75–100% of said non-gelatin protein content being made up of said dairy product-derived protein.

9. The food product of claim 1, said gelatin content being from about 6.2–10.5%.

10. The food product of claim 1, said water content being from about 30–60%.

11. The food product of claim 1, said fat content being from about 14–30%.

12. The food product of claim 1, said water activity being from about 0.8–0.9.

13. The food product of claim 1, said ratio being from about 0.15–2 g/cm$^2$.

14. The food product of claim 1, said pH being from about 4.8–6.0.

15. The food product of claim 1, said body including therein an ingredient selected from the group consisting of cheese, yogurt, pudding and mixtures thereof.

16. The food product of claim 15, said cheese being selected from the group consisting of cream cheese, American, Cheddar, Colby, Monterey jack, Swiss, mozzarella and mixtures thereof.

17. The food product of claim 15, said ingredient being present in said body at a level of from about 12–90%.

18. The food product of claim 17, said level being from about 18–60%.

19. The food product of claim 1, including respective quantities of one or more ingredients selected from the group consisting of whey powder, non-fat dry milk powder, lactic acid, preservatives and colors.

20. The food product of claim 1, said product being essentially free of visually observable gelatin particles under a 25× magnification.

* * * * *